UNITED STATES PATENT OFFICE.

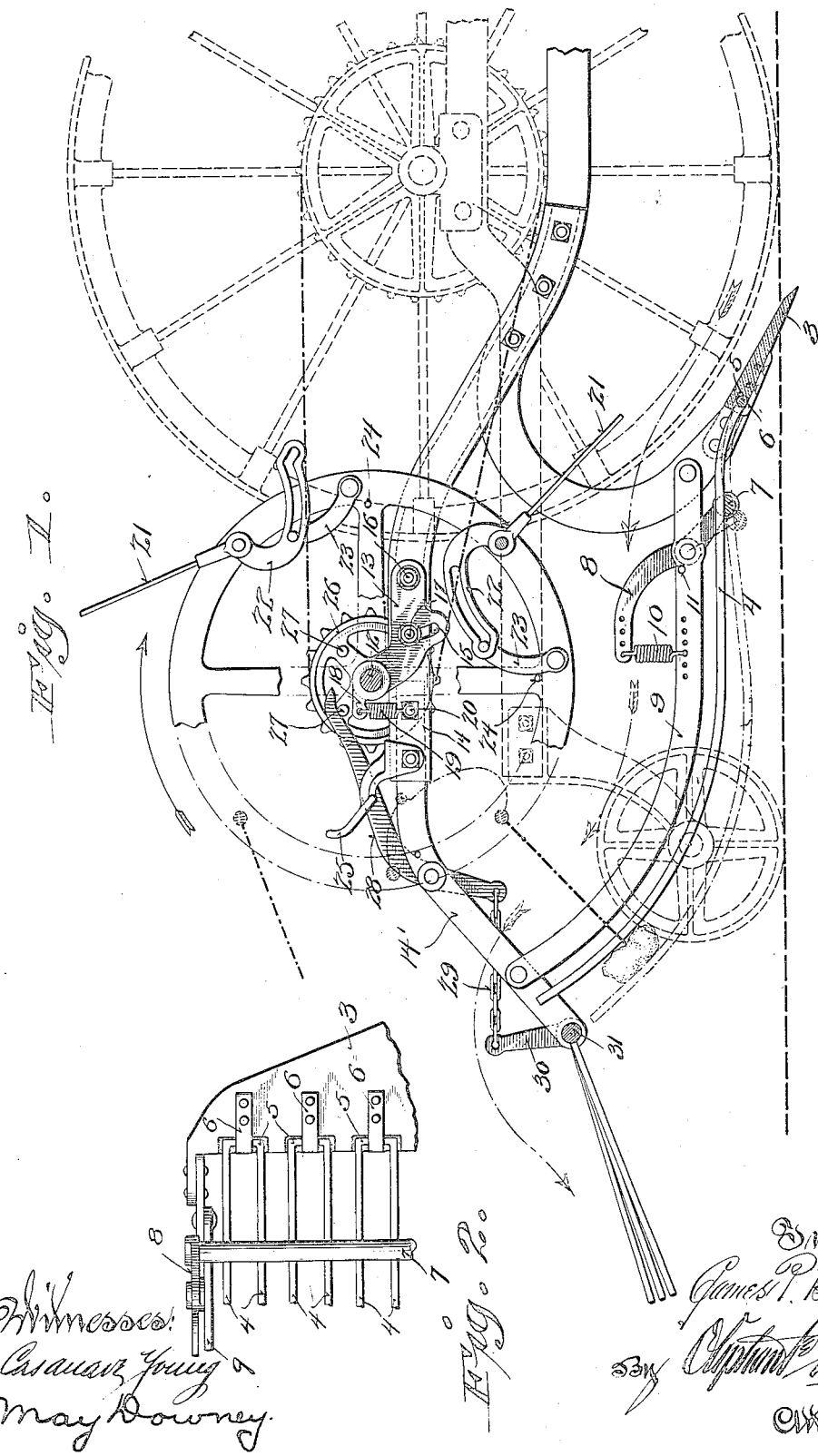

JAMES P. BRENNAN, OF COLUMBUS, WISCONSIN.

POTATO-HARVESTER.

1,042,640.  Specification of Letters Patent.  Patented Oct. 29, 1912.

Application filed April 11, 1911. Serial No. 620,282.

*To all whom it may concern:*

Be it known that I, JAMES P. BRENNAN, a citizen of the United States, and resident of Columbus, in the county of Columbia and State of Wisconsin, have invented certain new and useful Improvements in Potato-Harvesters; and I do hereby declare that the following is a full, clear, and exact description thereof.

My invention consists in what is herein particularly set forth with reference to the accompanying drawings and pointed out in the claims of this specification, its object being to improve the potato harvester disclosed by me in United States Letters Patent No. 973,852, issued October 25, 1910, the improvements pertaining to provision for yield of tines of the primary screen and of the reel-shaft of the harvester to clogging strain in the machine, the specific construction of said screen and to automatic vibration of the secondary screen of said harvester.

Figure 1 of the drawings represents a partly sectional elevation of my improved harvester viewed from one side of the same, and Fig. 2, a plan view of a fragment of the machine inverted.

Referring by letter to the drawings, 3 indicates the excavating-blade of the harvester hung in substantially the same manner as in the Letters Patent aforesaid, and 4 the tines of the primary screen of the machine, these tines being herein shown connected to said blade. The underside of the blade, at the rear thereof, is recessed at intervals, as shown in Fig. 2, to accommodate the angle bends 5 of preferably twin tines 4 of said primary screen, and said bends are caught in clips 6 fastened to said blade, each pair of the tines being a single suitably bent spring rod. All the tines of the primary screen engage recesses in a supporting rod 7 for which hangers are provided in the form of spring-controlled levers that are pivotally connected to the side guards of the machine, one of these hangers 8 and one of said guards 9 being herein shown. By providing each lever and guard with a series of apertures in which to selectively hook the ends of the hanger controlling spring 10, the position of said spring may be varied with reference to increasing or diminishing its tension on said hanger, which same abuts a stop 11 when in normal position.

The reel-shaft 12 of the machine is supported in hangers that are pivotally connected to the side bars of said machine, one of hangers 13 and one of the side bars 14 being herein shown. Each hanger is provided with a segmental slot 15 concentric with the pivot-bolt or stud 16 for said hanger, and the slot is engaged by a guide bolt or stud 17 in connection with the adjacent side bar 14. It is preferable to provide each reel-shaft hanger with an arm 18 and connect the same, by a spring 19 to a bolt or stud 20 projecting from the adjacent side bar.

As in the Letters Patent aforesaid, the harvester reel is provided with feathering forks, the tines 21 of which pass between those of the primary screen, and it is preferable, as herein shown, to have the slotted fork supporting arms 22 and the links 23 connecting said arms with the reel-heads curvilinear instead of angular. Link-stops 24 are provided on each reel-head and link-wipers are provided in connection with the side bars of the machine, one of said wipers 25 being herein shown.

The driven sprocket-wheel 26, fast on the reel-shaft 12, is provided on one side with a series of studs 27 at regular intervals apart, and a lever 28 fulcrumed to a side-bar extension 14' of the harvester has one end thereof in the path of said lugs. The other end of the lever is connected by a chain 29 or other suitable flexible device with a crank 30 of a rocking-bar 31 constituting part of the secondary screen, said rocking-bar being hung in the side bar extensions of the machine.

The general operation of the harvester is similar to that of the one disclosed in the aforesaid Letters Patent, but the tines of the primary screen are free at their rear ends and yield in pairs to clods, stones or other material caught between them and the tines of the reel-forks by which dead potato-vines and other trash are carried up and discharged from said primary screen onto the secondary screen from which said trash is finally discharged back of the machine. Incidental to pressure upon the tines of the primary screen there is swing of the supporting rod 7 against resistance of the springs that control its hangers, and the pressure being removed, said rod and tines are automatically returned to normal position by contraction of said shell. The rod 7 is a movable fulcrum for the screen-tines thereon and is designed to permit an initial yield of said screen to material caught between it and a fork of the pivotally hung reel, whereby bending or breaking strain upon the tines of said fork is avoided preliminary to an automatic lift of said reel. If the yield aforesaid is insufficient to permit ready fork clearance of the obstruction, the reel itself will lift a limited distance from normal position because of its shaft being supported in the pivotal segmentally slotted hangers 13 that are guided on the studs 17, the springs 19 serving to retard lift of said reel that automatically returns to normal position after said obstruction has been cleared, these movements of the aforesaid reel being effected without disturbing the motion of the machine. The action of the studs 27 of the sprocket-wheel 26 on the lever 28, results in a constant agitation of the secondary screen to facilitate the discharge of trash therefrom.

I claim:

1. In a potato harvester of the type specified, the combination with side bars of the machine, of hangers pivotally connected to the side bars and having segmental slots therein concentric with the hanger-pivots, guides in connection with said side bars engaging the slots of the hangers, and a reel having a shaft thereof supported in said hangers.

2. In a potato harvester of the type specified, the combination with side bars of the machine, of hangers pivotally connected to the side bars and having segmental slots therein concentric with the hanger-pivots, guides in connection with said side bars engaging the slots of the hangers, tension springs in connection with arms of said hangers, and a reel having a shaft thereof supported in the aforesaid hangers.

3. In a potato harvester of the type specified, the combination with side bars of the machine, of hangers pivotally connected to the side bars and having segmental slots therein concentric with the hanger-pivots, guides in connection with said side bars engaging the slots of the hangers, a reel having a shaft thereof supported in said hangers, and a screen comprising a series of yielding tines under the reel.

4. In a potato-harvester of the type specified, the combination of a yielding reel, and a screen comprising a series of yielding tines under the reel.

In testimony that I claim the foregoing I have hereunto set my hand at Columbus in the county of Columbia and State of Wisconsin in the presence of two witnesses.

JAMES P. BRENNAN.

Witnesses:
E. E. BROSSARD,
H. R. COOK.